United States Patent Office 2,755,278
Patented July 17, 1956

2,755,278

THIAMORPHOLONES AND THEIR PREPARATION

Moses Wolf Goldberg, Upper Montclair, and Hanns Hanina Lehr, Montclair, N. J., assignors to Hoffmann-La Roche Inc., Nutley, N. J., a corporation of New Jersey No Drawing. Application April 7, 1954,
Serial No. 421,680

7 Claims. (Cl. 260—243)

This invention relates to novel organic compounds, identified herein as substituted 3-thiamorpholone compounds. More particularly, it relates to substituted 3-thiamorpholones wherein each substituent is selected from the class consisting of lower alkyl radicals, at least one lower alkyl radical being attached to the thiamorpholone nucleus in the 2-position. The compounds of the invention can be represented by the following general formula (I)

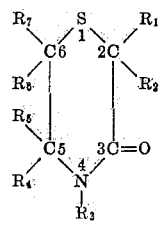

wherein $R_1$ represents a lower alkyl radical, and each of $R_2$ to $R_7$, inclusive, represents a member selected from the group consisting of hydrogen and lower alkyl radicals.

It will be understood that the specific values assumed by each of the variables $R_1$ to $R_7$, inclusive, in individual compounds comprehended within the above general formula, need not be identical.

The compounds of the above Formula I are useful in therapeutics; more particularly, they are useful because of their depressant effect upon the central nervous system, e. g. they are sedative and hypnotic compounds.

The invention further relates to novel processes of making the above defined compounds.

One process comprises condensing ethylene imine (or ethylene imine substituted by one or more lower alkyl radicals, which need not be identical), Formula II below, with an ester of an α-mercapto-alkanoic acid, Formula III below. This process of the invention can be represented in graphic general terms by the following equation:

(A)

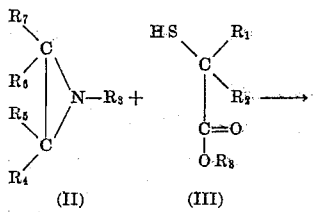

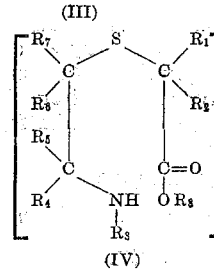

In the above equation, $R_1$ and $R_8$ each represents a lower alkyl radical, and these need not be identical; $R_2$ to $R_7$, inclusive, each represents a member selected from the group consisting of hydrogen and lower alkyl radicals, and these need not be identical.

The intermediate amino-sulfide ester, Formula IV, need not be isolated. The condensation can be effected merely by mixing the reactants under cooling, to keep the exothermic reaction under control. In some cases, it is necessary to complete the cyclization of the intermediate-amino-sulfide ester, Formula IV, by heating the reaction mixture.

An alternative process comprises the condensation of an alkali metal salt of a β-mercapto-alkyl amine, Formula V below, with an ester of an α-halo-alkanoic acid, Formula VI below. This process can be represented in graphic general terms by the following equation:

(B)

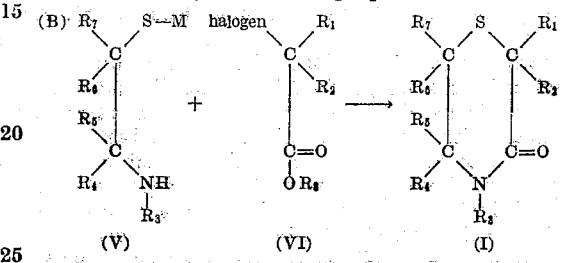

In the equation designated (B), $R_1$ to $R_8$, inclusive, have the same meaning previously indicated, and M represents an alkali metal.

The condensation can conveniently be effected by heating the reactants (V) and (VI) in an inert organic solvent.

Still another alternative process of preparation, of less general application, comprises condensing an ester of a nitroalkanol, Formula VII below, with an ester of an α-mercapto-alkanoic acid, Formula III above, to form a nitro-sulfide ester, Formula VIII below, and subjecting the latter to reductive condensation. This process can be illustrated in graphic general terms as follows:

(C)

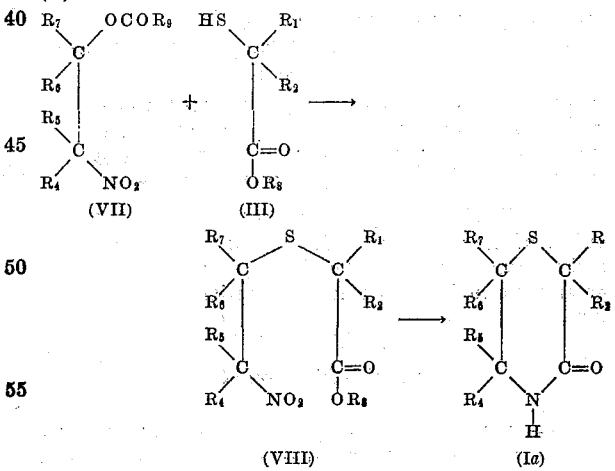

In the above Equation C, $R_1$, $R_2$ and $R_4$ to $R_8$, inclusive, have the same meaning indicated above, and $R_9$ represents a lower alkyl radical.

The preparation of (VIII) can be effected by treating the reactants (VII) and (III), dissolved in an inert organic solvent, with a lower alkoxide of an alkali metal, e. g. by treating (VII) and (III) in methanol with sodium methoxide. The conversion of (VIII) to (Ia) can be effected by reduction, e. g. by treating (VIII) with iron and glacial acetic acid.

The esters of α-mercapto-alkanoic acids, Formula III above, can be prepared from the corresponding α-bromo acids by reaction thereof with potassium ethyl xanthate and saponification of the resulting α-thionocarbethoxymercapto acids with ammonia to form the corresponding α-mercapto-alkanoic acids, which can then be esterified by conventional procedures. The preparation of ethyl α-mercapto-α,α-diethylacetate is described below as being illustrative of the method:

To a mixture of 97 g. of α-bromo-α,α-diethylacetic acid and 250 cc. of water was added 180 g. of potassium ethyl xanthate. The turbid yellow solution was allowed to stand at room temperature for two days. The mixture was extracted twice with 100 cc. portions of ether and the ether extract discarded. 100 cc. of conc. HCl was then added and the separated oil extracted with three portions of 200 cc. of ether. The combined ether extracts were dried over sodium sulfate. After removal of the ether in vacuo, a yellow oily residue was obtained which crystallized partly on chilling. The crystals were collected and washed with petroleum ether. A sample of α-(thionocarbethoxymercapto)-α,α-diethylacetic acid thus obtained was recrystallized from ethanol-water. M. P. 114–116°.

Seventy-one g. of α-(thionocarbethoxymercapto)-α,α-diethylacetic acid was dissolved in 400 cc. of conc. aqueous ammonia and the solution allowed to stand at room temperature for three days. The reaction mixture was extracted 3 times with 200 cc. portions of ether to remove the xanthogenamide formed. The aqueous layer was cooled with ice-water and acidified in a nitrogen-atmosphere with conc. HCl. α-Mercapto-α,α-diethylacetic acid deposited as an oil, which was taken up in ether. The ether solution was dried over sodium sulfate. After removal of the ether, the residue was fractionated in vacuo. α-Mercapto-α,α-diethylacetic acid distilled at 122–125°/14 mm. as a colorless viscous oil, solidifying slowly to long white needles melting at 35–37°.

Thirty-six g. of α-mercapto-α,α-diethylacetic acid was dissolved in 150 cc. of ethanol. 15 cc. of conc. H₂SO₄ was added and the mixture refluxed under nitrogen for 18 hours. About half of the ethanol was then distilled off and the remaining concentrate was neutralized with aqueous sodium carbonate. The ester separated as an oil and was extracted with ether. The ether extract was dried over sodium sulfate. After removal of the ether, the residue was fractionated in vacuo. Ethyl α-mercapto-α,α-diethylacetate boils at 80–82°/12 mm.

By a similar procedure, the following esters of α-mercapto-alkanoic acids were prepared:

Ethyl α-mercapto propionate, B. P. 54–55°/13 mm.
Ethyl α-mercapto-n-butyrate, B. P. 54–56°/8 mm.
Ethyl α-mercapto-isobutyrate, B. P. 49–51°/14 mm.
Ethyl α-mercapto-n-valerate, B. P. 82°/15 mm.

The following examples are illustrative, but not limitative, of the invention. All temperatures are corrected and are stated in degrees centigrade, as also are the temperatures stated in the preceding portion of the description.

EXAMPLE 1

2-methyl-3-thiamorpholone

Eleven g. of ethyl α-mercaptopropionate and 5 g. of ethylene imine (20 per cent excess) were mixed under cooling, kept at 60° for 2 hours, and then at room temperature for 3 days. On chilling, crystals deposited, which were filtered off and washed with a minimum of ice-cold ethanol. After recrystallization from benzene-petroleum ether, the white crystals of 2-methyl-3-thiamorpholone melted at 75–76°.

EXAMPLE 2

2,2-dimethyl-3-thiamorpholone

Fourteen g. of ethyl α-mercaptoisobutyrate was mixed under cooling with 5.2 g. of ethylene imine. The mixture was kept for 2 hours at 60° and for 3 days at room temperature. The solid residue was treated with petroleum ether and filtered. After recrystallization from ligroin (60–90°), the white crystals of 2,2-dimethyl-3-thiamorpholone melted at 107–108°.

EXAMPLE 3

2-ethyl-3-thiamorpholone

Twenty-six g. of ethyl α-mercaptobutyrate was mixed under cooling with 9 g. of ethylene imine. The mixture was kept at 60° for 2 hours and at room temperature for 2 days. On chilling, crystals were obtained, which were filtered and washed with a small amount of ice-cold ethanol. After recrystallization from benzene-petroleum ether, the white crystals of 2-ethyl-3-thiamorpholone melted at 59–61°.

EXAMPLE 4

2,2-diethyl-3-thiamorpholone

Seventy-six g. of ethyl α-mercapto-α,α-diethylacetate were mixed under cooling with 23 g. of ethylene imine, care being taken that the temperature did not exceed 65°. The mixture was then kept for 2 hours at 60° and for 4 days at room temperature. Fractional distillation in vacuo yielded ethyl α-(β-aminomethylmercapto)-α,α-diethylacetate, as a colorless liquid boiling at 115–130°/0.8 mm. The hydrochloride, after recrystallization from ether-petroleum ether, melted at 73–75°.

Seventy-six g. of the free amino ester was heated in an oil bath to 200° for 6 hours. Fractional distillation in vacuo yielded some unreacted amino ester (B. P. 118–138°/0.7 mm.) and a viscous liquid, which distilled at 138–150°/0.7 mm., and solidified on cooling to white crystals. They were washed with pentane and filtered. After recrystallization from pentane, the 2,2-diethyl-3-thiamorpholone thus obtained melted at 52–54°.

EXAMPLE 5

2-propyl-3-thiamorpholone

Twenty-one g. of ethyl α-mercaptovalerate and 6.5 g. of ethylene imine were mixed under cooling. The mixture was kept for 2 hours at 60° and for 3 days at room temperature. Distillation in vacuo yielded a fraction boiling at 145–153°/0.9 mm., which was redistilled. The fraction boiling at 136–140°/0.7 mm. crystallized on cooling. After recrystallization from petroleum ether, the 2-propyl-3-thiamorpholone melted at 50–52°.

EXAMPLE 6

2,5-dimethyl-3-thiamorpholone

Twenty g. of ethyl α-mercaptopropionate were mixed under cooling with 10.2 g. of 2-methyl-ethylene imine. The mixture was kept for 2 hours at 60° and for 3 days at room temperature. The partly solidified reaction mixture was dissolved in hot ligroin (B. P. 60–90°). On cooling, crystals deposited, which were collected and dried in vacuo. Recrystallization from ligroin (B. P. 60–90°) gave white crystals of 2,5-dimethyl-3-thiamorpholone which melted at 93–95°.

EXAMPLE 7

2,2,5-trimethyl-3-thiamorpholone

Twenty g. of ethyl α-mercapto-isobutyrate were mixed under cooling with 9.3 g. of 2-methyl-ethylene imine. The mixture was kept at 60° for 2 hours and at room temperature for 3 days. The partly solidified reaction mixture was diluted with petroleum ether and the crystals filtered off. After recrystallization from ligroin (B. P. 60–90°), the white crystals of 2,2,5-trimethyl-3-thiamorpholone melted at 127–128°.

EXAMPLE 8

2,5,5-trimethyl-3-thiamorpholone

Nineteen g. of ethyl α-mercaptopropionate were mixed under cooling with 12.5 g. of 2,2-dimethyl-ethylene imine. The mixture was kept at 60° for 2 hours and at room temperature for 3 days. The reaction mixture was fractionated in vacuo. The fraction boiling at 88–104°/0.5 mm. was collected and heated in an oil bath at 180–200° for 7 hours. On cooling, all solidified. The crystals were treated with ligroin (B. P. 60–90°) and filtered. After recrystallization from ligroin, the white crystals of 2,5,5-trimethyl-3-thiamorpholone melted at 137–139°.

EXAMPLE 9

2,2,5,5-tetramethyl-3-thiamorpholone

Twenty g. of ethyl α-mercaptoisobutyrate were mixed under cooling with 12 g. of 2,2-dimethylethylene imine. The mixture was kept at 60° for 2 hours and at room temperature for 3 days. Fractional distillation yielded 23 g. of a liquid boiling at 120–123°/3 mm., which after heating for 7 hours at 180–200° solidified in the cold. After recrystallization from ethanol, the white crystals of 2,2,5,5-tetramethyl-3-thiamorpholone melted at 172–174°.

EXAMPLE 10

2-ethyl-5-methyl-3-thiamorpholone

Twenty g. of ethyl α-mercaptobutyrate and 9.3 g. of 2-methyl-ethylene imine were mixed under cooling. The mixture was kept for 2 hours at 60° and for 3 days at room temperature. The reaction mixture was taken up in petroleum ether and the crystals filtered off. After recrystallization from ligroin (B. P. 60–90°), the white crystals of 2-ethyl-5-methyl-3-thiamorpholone melted at 82–84°.

EXAMPLE 11

2,2-diethyl-5-methyl-3-thiamorpholone

Thirty g. of ethyl α-mercapto-α,α-diethylacetate were mixed with 12 g. of 2-methylethylene imine under cooling. The mixture was kept at 60° for 2 hours and at room temperature for 3 days. Fractional distillation yielded a liquid boiling at 115–122°/0.6 mm. This fraction, consisting mostly of ethyl (β-aminopropylmercapto)-diethylacetate, was heated for 6 hours at 180–200°. Redistillation in vacuo gave unchanged material (B. P. 113–125°/0.5 mm.) and a liquid, boiling at 135–138°/0.5 mm., which solidified on cooling. After recrystallization of the solid from pentane, the white crystals of 2,2-diethyl-5-methyl-3-thiamorpholone thus obtained melted at 53–55°.

EXAMPLE 12

2-ethyl-5,5-dimethyl-3-thiamorpholone

Twenty g. of ethyl α-mercaptobutyrate was mixed under cooling with 12 g. of 2,2-dimethylethylene imine. The mixture was kept for 2 hours at 60° and for 3 days at room temperature. Distillation in vacuo yielded a liquid boiling at 92–100°/0.5 mm., which after being heated at 180° for 7 hours solidified on cooling. Ligroin (B. P. 60–90°) was added and the crystals filtered off. After recrystallization from ligroin (B. P. 60–90°), the white crystals of 2-ethyl-5,5-dimethyl-3-thiamorpholone melted at 114–116°.

EXAMPLE 13

2,2-diethyl-5,5-dimethyl-3-thiamorpholone

Twenty-nine g. of ethyl α-mercapto-α,α-diethylacetate was mixed under cooling with 13 g. of 2,2-dimethylethylene imine. The mixture was kept for 2 hours at 60° and for 3 days at room temperature. Distillation in vacuo yielded the intermediate ethyl (β-aminoisobutylmercapto)diethylacetate as a liquid boiling at 110–125°/0.6 mm. A sample was converted to the hydrochloride in the usual manner. After recrystallization from acetone-petroleum ether the hydrochloride of ethyl (β-aminoisobutylmercapto)diethylacetate melted at 169–171°.

The free amino ester was heated for 24 hours at 180–200° and distilled in vacuo. Some unchanged amino ester was collected, and the residue solidified on cooling. After recrystallization of the solid from pentane the white crystals of 2,2-diethyl-5,5-dimethyl-3-thiamorpholone thus obtained melted at 73–75°.

EXAMPLE 14

2-propyl-5-methyl-3-thiamorpholone

Twenty-two g. of ethyl α-mercaptovalerate was mixed under cooling with 9.5 g. of 2-methylethylene imine. The mixture was kept at 60° for 2 hours and at room temperature for 3 days. Petroleum ether was added to the partly solidified reaction mixture and the first crop of crystals collected. The filtrate was fractionated in vacuo, yielding a liquid boiling at 139–141°/0.5 mm. which solidified on cooling. After recrystallization of the combined solids from pentane, the white crystals of 2-propyl-5-methyl-3-thiamorpholone melted at 52–55°.

EXAMPLE 15

2-propyl-5,5-dimethyl-3-thiamorpholone

Twenty-two g. of ethyl α-mercaptovalerate was mixed with 11.6 g. of 2,2-dimethylethylene imine under cooling. The mixture was kept for 2 hours at 60° and for 3 days at room temperature. Distillation in vacuo yielded a colorless liquid boiling at 112–130°/0.8 mm., which was heated for 7 hours at 180–200°. After cooling, petroleum ether was added to the solidified mixture and the crystals collected. Recrystallization from petroleum ether yielded white crystals of 2-propyl-5,5-dimethyl-3-thiamorpholone melting at 91–93°.

EXAMPLE 16

2-methyl-5-ethyl-3-thiamorpholone

Twenty g. of ethyl α-mercaptopropionate was mixed under cooling with 13 g. of 2-ethylethylene imine. The mixture was kept at 60° for 2 hours and at room temperature for 3 days. Petroleum ether was added to the mixture and the crystals filtered off. After recrystallization from petroleum ether, the white crystals of 2-methyl-5-ethyl-3-thiamorpholone had a melting point of 92–94°.

EXAMPLE 17

2,2-dimethyl-5-ethyl-3-thiamorpholone

Twenty-one g. of ethyl α-mercaptoisobutyrate was mixed under cooling with 9.7 g. of 2-ethylethylene imine. The mixture was kept for 2 hours at 60° and for 3 days at room temperature. A small amount of crystals were obtained, which were filtered off. The filtrate was distilled in vacuo yielding 16 g. of a liquid boiling at 103–116°/0.5 mm., which solidified after being heated at 180° for 6 hours. Ligroin (B. P. 60–90°) was added and the solids collected. After recrystallization of the combined solids from ligroin, the white crystals of 2,2-dimethyl-5-ethyl-3-thiamorpholone melted at 102–103°.

EXAMPLE 18

2,5-diethyl-3-thiamorpholone

Twenty g. of ethyl α-mercaptobutyrate was mixed with 12 g. of 2-ethylethylene imine under cooling. The mixture was kept for 2 hours at 60° and for 3 days at room temperature. On chilling, crystals were obtained, which were filtered off and washed with petroleum ether. After recrystallization from ligroin (B. P. 60–90°), the white crystals of 2,5-diethyl-3-thiamorpholone melted at 83–84°.

EXAMPLE 19

2,2,5-triethyl-3-thiamorpholone

Thirty-two g. of ethyl α-mercapto-α,α-diethylacetate was mixed under cooling with 15 g. of 2-ethylethylene imine. The mixture was kept for 2 hours at 60° and for 3 days at room temperature. Distillation in vacuo yielded a colorless liquid, boiling at 116–130°/0.4 mm., which was heated for 24 hours at 180–200°. Fractional distillation yielded a liquid boiling at 140–144°/0.6 mm., which solidified in the cold. The 2,2,5-triethyl-3-thiamorpholone thus obtained was recrystallized from pentane and the white crystals then melted at 47–48°.

EXAMPLE 20

2-propyl-5-ethyl-3-thiamorpholone

Twenty-two g. of ethyl α-mercaptovalerate and 11.6 g. of 2-ethylethylene imine were mixed under cooling. The mixture was kept for 2 hours at 60° and for 3 days at room temperature. Distillation in vacuo yielded a first fraction boiling at 110–145°/0.5 mm. and a second fraction boiling at 145–148°/0.5 mm. The first fraction was heated for 7 hours at 180–200° and redistilled, yielding a liquid which solidified in the cold. The second fraction solidified without further heating. After recrystallization of the combined solids from pentane, the white crystals of 2-propyl-5-ethyl-3-thiamorpholone thus obtained melted at 51–53°.

EXAMPLE 21

2,2-diethyl-4-methyl-3-thiamorpholone

Thirty g. of ethyl α-mercapto-α,α-diethylacetate and 12 g. of N-methylethylene imine were mixed under cooling. The mixture was kept at 60° for 2 hours and at room temperature for 7 days. Fractional distillation in vacuo yielded a liquid boiling at 112–132°/0.5 mm., which was heated at 190–200° for 6 hours. Fractional distillation of the heated liquid gave 2,2-diethyl-4-methyl-3-thiamorpholone, a colorless liquid boiling at 109–110°/0.6 mm.

EXAMPLE 22

2,2-dimethyl-3-thiamorpholone

Twelve g. of β-mercaptoethylamine was dissolved in 150 cc. of dry dioxane. Sodium (3.5 g.) was added and the mixture refluxed overnight under nitrogen. Thirty g. of ethyl α-bromoisobutyrate, dissolved in 50 cc. of dioxane, was then added slowly and the mixture refluxed for 8 hours. After being kept at room temperature for 2 days, the sodium bromide was filtered off and the solvent removed in vacuo. The oily residue crystallized on chilling. Recrystallization from benzene-petroleum ether yielded 2,2-dimethyl-3-thiamorpholone, white crystals melting at 108–109°. The mixed melting point with a sample of 2,2-dimethyl-3-thiamorpholone obtained by condensation of ethylene imine with ethyl α-mercaptoisobutyrate (Example 2) showed no depression.

EXAMPLE 23

2-isopropyl-3-thiamorpholone

Twelve g. of β-mercaptoethylamine was dissolved in 150 cc. of dry dioxane. Sodium (3.5 g.) was added, and the mixture refluxed for 5 hours under nitrogen. To the suspension was then added 33 g. of ethyl α-bromovalerate, and the mixture refluxed overnight. After filtering off the sodium bromide, the solvent was removed in vacuo. The liquid residue was heated for 7 hours at 180–200°. Fractional distillation in vacuo yielded a colorless viscous liquid boiling at 130–139°/0.5 mm., which crystallized in the cold. After recrystallization from petroleum ether, the white crystals of 2-isopropyl-3-thiamorpholone melted at 48–50°.

EXAMPLE 24

2-ethyl-6-methyl-3-thiamorpholone

Sodium (5.8 g.) was dissolved in 100 cc. of methanol. To this solution was added slowly and under cooling 37 g. of ethyl α-mercaptobutyrate in 50 cc. of methanol, followed by 37 g. of 1-nitro-2-acetoxypropane in 50 cc. of methanol. The stirred reaction mixture was kept for 1 hour at —10° and was then allowed to reach room temperature. After standing overnight, the methanol was removed in vacuo. The residue was treated with water and ether, the two layers were separated, and the aqueous layer was extracted once more with ether. The combined ether extracts were washed with 5 per cent NaHCO₃ solution and water, and dried over sodium sulfate. After removal of the ether, the residue was fractionated in vacuo. Ethyl α-(2-nitroisopropylmercapto)butyrate was obtained as a colorless oil boiling at 127–129°/0.8 mm.

Sixty g. of iron filings were suspended in 300 cc. of water containing 6 cc. of glacial acetic acid. The mixture was refluxed for 1 hour. Forty-four g. of ethyl α-(2-nitroisopropylmercapto)butyrate, dissolved in 50 cc. of ethanol, was gradually added to the boiling reaction mixture, and the refluxing continued overnight. After cooling, the mixture was made alkaline with sodium carbonate and the iron filtered off. The aqueous filtrate was evaporated to dryness, and the residue was extracted three times with ethyl acetate. The combined extracts were dried over sodium sulfate. After removal of the solvent in vacuo, the red-brown oily residue was dissolved in ligroin (B. P. 60–90°). The turbid solution was treated with charcoal, filtered, and taken to dryness. The light-yellow residue which solidified partly, was diluted with petroleum ether, and the crystals that formed were collected. After recrystallization from petroleum ether, the white crystals of 2-ethyl-6-methyl-3-thiamorpholone thus obtained melted at 73–74°.

We claim:

1. A substituted 3-thiamorpholone wherein each substituent is selected from the class consisting of lower alkyl radicals, at least one lower alkyl radical being attached to the thiamorpholone nucleus in the 2-position.
2. 2,2-diethyl-3-thiamorpholone.
3. 2-propyl-3-thiamorpholone.
4. 2-isopropyl-3-thiamorpholone.
5. 2,2-diethyl-5-methyl-3-thiamorpholone.
6. 2,2,5-triethyl-3-thiamorpholone.
7. A process of making a substituted 3-thiamorpholone having the formula

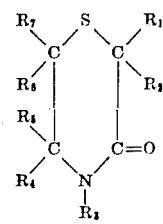

wherein R₁ represents a lower alkyl radical, and each of R₂ to R₇, inclusive, represents a member selected from the group consisting of hydrogen and lower alkyl radicals which comprises condensing an alkali metal salt of a β-mercapto-alkyl amine having the formula

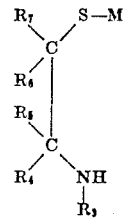

wherein R₃, R₄, R₅, R₆ and R₇ have the same meaning indicated above, and M represents an alkali metal with an ester of an α-haloalkanoic acid having the formula

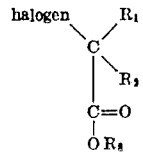

wherein R₁ and R₂ have the same meaning indicated above, and R₈ represents a lower alkyl radical while heating the reactants in an inert organic solvent.

References Cited in the file of this patent

Bestian et al.: "Ann." (1950), vol. 566, pp. 210–44 (also in Chem. Abst., 1950, vol. 44, pp. 5805–7).